(12) United States Patent
Marcinkiewicz et al.

(10) Patent No.: US 7,583,049 B2
(45) Date of Patent: Sep. 1, 2009

(54) SENSORLESS CONTROL SYSTEMS AND METHODS FOR PERMANENT MAGNET ROTATING MACHINES

(75) Inventors: Joseph G. Marcinkiewicz, St. Peters, MO (US); Prakash B. Shahi, St. Louis, MO (US); Michael I. Henderson, North Yorkshire (GB)

(73) Assignee: Emerson Electric Co., St. Louis, MO (US)

( * ) Notice: Subject to any disclaimer, the term of this patent is extended or adjusted under 35 U.S.C. 154(b) by 8 days.

(21) Appl. No.: 12/070,593

(22) Filed: Feb. 20, 2008

(65) Prior Publication Data

US 2008/0143289 A1    Jun. 19, 2008

Related U.S. Application Data

(62) Division of application No. 11/293,744, filed on Dec. 2, 2005, now Pat. No. 7,342,379.

(60) Provisional application No. 60/694,077, filed on Jun. 24, 2005, provisional application No. 60/694,066, filed on Jun. 24, 2005.

(51) Int. Cl.
*H02P 23/00* (2006.01)
(52) U.S. Cl. .................. 318/807; 318/561; 318/615
(58) Field of Classification Search ............. 318/807, 318/561, 615, 431, 560, 430, 433, 434, 799, 318/66; 388/814
See application file for complete search history.

(56) References Cited

U.S. PATENT DOCUMENTS

| | | | |
|---|---|---|---|
| 4,288,726 A | 9/1981 | Vazquez-Cuervo et al. | |
| 4,633,157 A | 12/1986 | Streater | |
| 5,006,770 A | 4/1991 | Sakamoto et al. | |
| 5,006,774 A | 4/1991 | Rees | |
| 5,173,650 A | 12/1992 | Hedlund | |
| 5,220,264 A | 6/1993 | Yamada | |
| 5,311,435 A | 5/1994 | Yocum et al. | |
| 5,447,414 A | 9/1995 | Nordby et al. | |

(Continued)

OTHER PUBLICATIONS

"High Performance Sensorless Solutions For Induction Motor Control", V. Bostan, M. Cuibus and C. Ilas; pp. 1-9; prior to Jun. 24, 2005.

(Continued)

*Primary Examiner*—Karen Masih
(74) *Attorney, Agent, or Firm*—Harness, Dickey & Pierce, P.L.C.

(57) ABSTRACT

Systems and methods for controlling a rotating electromagnetic machine. The rotating machine, such as a permanent magnet motor or hybrid switched reluctance motor, includes a stator having a plurality of phase windings and a rotor that rotates relative to the stator. A drive is connected to the phase windings for energizing the windings. A controller outputs a control signal to the drive in response to an input demand such as a demanded speed or torque. Control methods (which can be implemented separately or in combination) include varying the gain of an estimator as a function of a demanded or estimated speed to position control system poles at desired locations, de-coupling control system currents to achieve a constant torque with motor speed, compensating flux estimates of the estimator for saturation operation of the stator, estimating rotor position using averages of sample values of energization feedback, and calculating a trim adjusted speed error from a plurality of speed estimates.

12 Claims, 13 Drawing Sheets

U.S. PATENT DOCUMENTS

| | | |
|---|---|---|
| 5,457,375 A | 10/1995 | Marcinkiewicz et al. |
| 5,495,162 A | 2/1996 | Rozman et al. |
| 5,498,945 A | 3/1996 | Prakash |
| 5,569,994 A | 10/1996 | Taylor et al. |
| 5,635,810 A | 6/1997 | Goel |
| 5,703,449 A | 12/1997 | Nagate et al. |
| 5,736,823 A | 4/1998 | Nordby et al. |
| 5,747,971 A | 5/1998 | Rozman et al. |
| 5,789,893 A | 8/1998 | Watkins |
| 5,801,935 A | 9/1998 | Sugden et al. |
| 5,854,547 A | 12/1998 | Nakazawa |
| 5,903,128 A | 5/1999 | Sakakibara et al. |
| 5,929,590 A | 7/1999 | Tang |
| 5,953,491 A | 9/1999 | Sears et al. |
| 6,005,364 A | 12/1999 | Acarnley |
| 6,081,093 A | 6/2000 | Oguro et al. |
| 6,137,258 A | 10/2000 | Jansen |
| 6,232,692 B1 | 5/2001 | Kliman |
| 6,278,256 B1 | 8/2001 | Aoyama |
| 6,297,621 B1 | 10/2001 | Hui et al. |
| 6,304,052 B1 | 10/2001 | O'Meara et al. |
| 6,326,750 B1 | 12/2001 | Marcinkiewicz |
| 6,362,586 B1 | 3/2002 | Naidu |
| 6,369,536 B2 | 4/2002 | Beifus et al. |
| 6,404,154 B2 | 6/2002 | Marcinkiewicz |
| 6,433,506 B1 | 8/2002 | Pavlov et al. |
| 6,441,580 B2 | 8/2002 | Marcinkiewicz |
| 6,443,873 B2 | 9/2002 | Suzuki |
| 6,462,491 B1 | 10/2002 | Iijima et al. |
| 6,515,395 B1 | 2/2003 | Jansen |
| 6,515,442 B1 | 2/2003 | Okubo et al. |
| 6,567,282 B1 | 5/2003 | Kikuchi et al. |
| 6,586,904 B2 | 7/2003 | McClelland et al. |
| 6,603,226 B1 | 8/2003 | Liang et al. |
| 6,628,099 B2 | 9/2003 | Iwaji et al. |
| 6,661,194 B2 | 12/2003 | Zaremba et al. |
| 6,690,137 B2 | 2/2004 | Iwaji et al. |
| 6,696,812 B2 | 2/2004 | Kaneko et al. |
| 6,731,083 B2 | 5/2004 | Marcinkiewicz |
| 6,750,626 B2 | 6/2004 | Leonardi et al. |
| 6,756,753 B1 | 6/2004 | Marcinkiewicz et al. |
| 6,756,757 B2 | 6/2004 | Marcinkiewicz et al. |
| 6,791,293 B2 | 9/2004 | Kaitani |
| 6,801,012 B1 | 10/2004 | Islam et al. |
| 6,828,751 B2 | 12/2004 | Sadasivam et al. |
| 6,831,439 B2 | 12/2004 | Won et al. |
| 6,874,221 B2 | 4/2005 | Jansen et al. |
| 6,879,124 B1 | 4/2005 | Jiang et al. |
| 6,883,333 B2 | 4/2005 | Shearer et al. |
| 6,894,454 B2 | 5/2005 | Patel et al. |
| 7,084,591 B2 | 8/2006 | Kobayashi et al. |
| 7,095,131 B2 | 8/2006 | Mikhail et al. |
| 7,191,607 B2 * | 3/2007 | Curtis ............... 62/186 |
| 2003/0027537 A1 * | 2/2003 | Kimura ............ 455/232.1 |
| 2003/0163226 A1 | 8/2003 | Tan |
| 2003/0234629 A1 | 12/2003 | Trifilo |
| 2004/0130375 A1 * | 7/2004 | Tachibana ........... 327/309 |
| 2006/0267535 A1 * | 11/2006 | Iwashita et al. ....... 318/619 |
| 2007/0007055 A1 | 1/2007 | Schmidt et al. |
| 2007/0200522 A1 * | 8/2007 | Kees et al. ............ 318/432 |

OTHER PUBLICATIONS

"An AC Motor Closed Loop Performances With Different Rotor Flux Observers", M. Alexandru, R. Bojoi, G. Ghelardi and S.M. Tenconi; pp. 1-7; prior to Jun. 24, 2005.

"Indirect Rotor-Position Estimation Techniques For Switched Reluctance Motors—A Review"; Iqbal Hussain; pp. 1-15; prior to Jun. 24, 2005.

"Lecture 9: State Observer And Output Feedback Controller"; pp. 1-14; May 16, 2005.

"Sensorless Motor Control Method For Compressor Applications"; Yashvant Jani; pp. 1-23; Mar. 29, 2005.

"Energy Conversion and Transport"; George G. Karady and Keith Holbert; Chapter 9, Introduction to Motor Control And Power Electronics; EE360; pp. 1-37; prior to Jun. 24, 2005.

"Minimum Error Entropy Luenberger Observer"; Jian-Wu Xu, Deniz Erdogmus and Jose C. Principe; pp. 1-13; prior to Jun. 24, 2005.

* cited by examiner

SENSORLESS CONTROL SYSTEMS AND METHODS FOR PERMANENT MAGNET ROTATING MACHINES

CROSS-REFERENCE TO RELATED APPLICATIONS

This application is a divisional of U.S. application Ser. No. 11/293,744 filed Dec. 2, 2005, now U.S. Pat. No. 7,342,379 and claims the benefit of U.S. Provisional Applications No. 60/694,077 and No. 60/694,066 filed Jun. 24, 2005. The entire disclosures of the above applications are incorporated herein by reference.

FIELD

The present disclosure relates generally to control of rotating machines, including but not limited to sensorless control of permanent magnet rotating machines.

BACKGROUND

Permanent magnet machines, such as brushless permanent magnet motors, have been conventionally provided with position sensing devices. Such devices indicate, for use in controlling the motor, the rotor position with respect to the stator. However, rotor position sensors can be quite expensive, occupy space within a motor housing, and sometimes fail. To eliminate the need for position sensors, various "sensorless" motor constructions and methods have been developed with varying degrees of success. As recognized by the present inventors a need exists for improvements in sensorless control systems for rotating permanent magnet machines.

SUMMARY

According to one aspect of the present disclosure, a method is provided for estimating rotor position in a sensorless control system for a permanent magnet rotating machine. The machine includes a stator and a rotor situated to rotate relative to the stator. The stator has a plurality of energizable phase windings situated therein. The method includes sampling energization feedback from the machine to obtain a plurality of samples, averaging a pair of the plurality of samples to produce an average sample value, and estimating the rotor position using the average sample value.

According to another aspect of the present disclosure, a method is provided for controlling a permanent magnet rotating machine. The machine includes a stator and a rotor situated to rotate relative to the stator. The stator has a plurality of energizable phase windings situated therein. The method includes producing a first rotor speed estimate, producing a second rotor speed estimate, and calculating a trim-adjusted speed error using the first rotor speed estimate and the second rotor speed estimate.

Further aspects of the present disclosure will be in part apparent and in part pointed out below. It should be understood that various aspects of this disclosure may where suitable be implemented individually or in combination with one another. It should also be understood that the detailed description and drawings, while indicating certain exemplary embodiments, are intended for purposes of illustration only and should not be construed as limiting the scope of this disclosure.

BRIEF DESCRIPTION OF THE DRAWINGS

Like reference symbols indicate like elements or features throughout the drawings.

DETAILED DESCRIPTION OF EXEMPLARY EMBODIMENTS

Illustrative embodiments are described below. In the interest of clarity, not all features of an actual implementation are described in this specification. It will be appreciated that in the development of any actual embodiment, numerous implementation-specific decisions must be made to achieve specific goals, such as performance objectives and compliance with system-related, business-related and/or environmental constraints. Moreover, it will be appreciated that such development efforts may be complex and time-consuming, but would nevertheless be a routine undertaking for those of ordinary skill in the art having the benefit of this disclosure.

Figure 1:
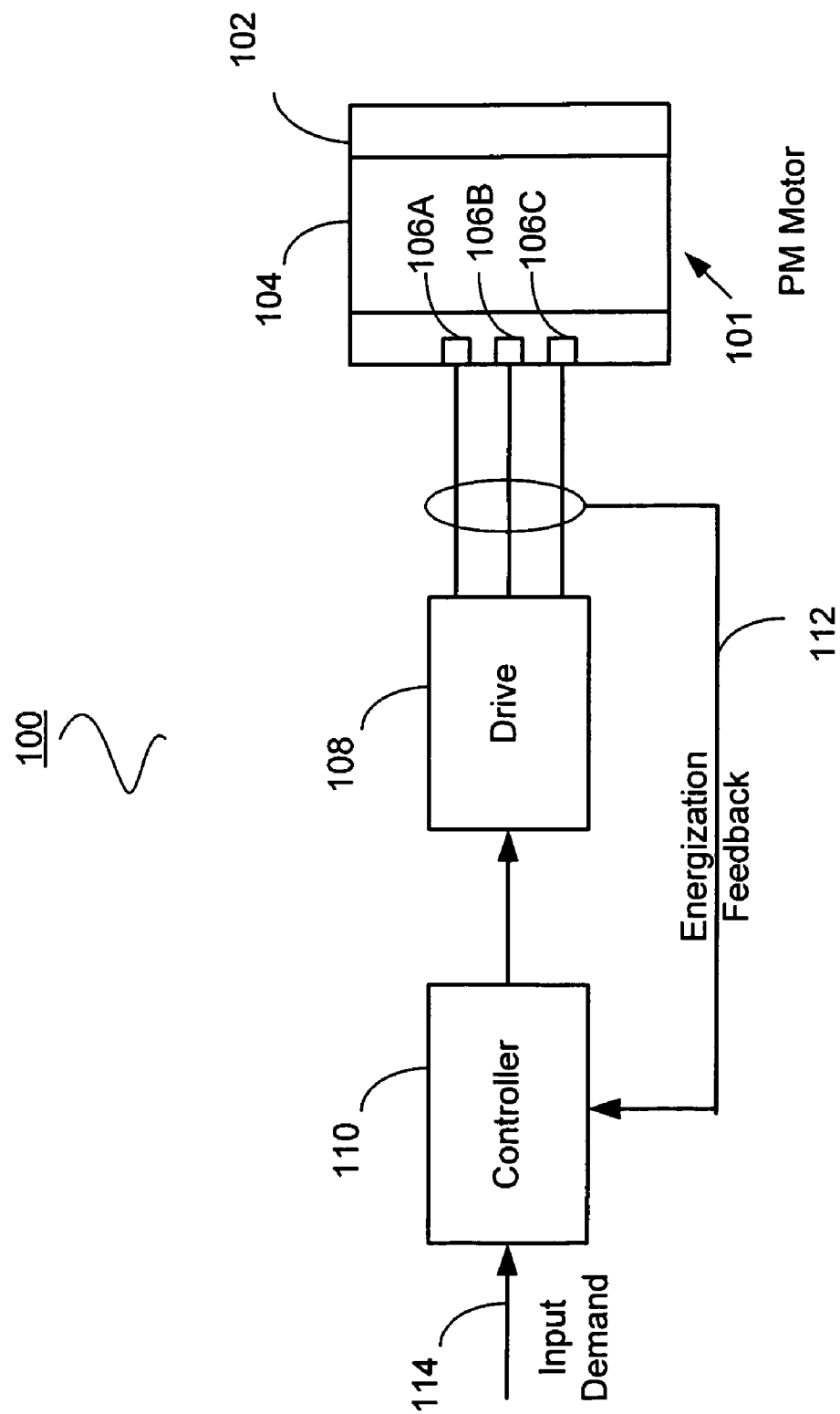
FIG. 1 is a block diagram of a rotating permanent magnet (PM) machine system according to one exemplary embodiment of this disclosure.

FIG. 1 illustrates a rotating permanent magnet machine system 100 according to one embodiment of the present disclosure. The machine system 100 includes a rotating permanent magnet electric machine 101, such as a permanent magnet alternating current (PMAC) motor or a hybrid permanent magnet/switched reluctance (PM/SR) motor. For simplicity, the term "motor" is often used in this specification. However, one skilled in the art having the benefit of this disclosure will understand that it is applicable to other types of rotating electric machines, including generators. The PM machine 101 shown in FIG. 1 includes a stationary component (stator) 102 and a rotating component (rotor) 104. The machine 101 can have an inner rotor or an outer rotor construction. In this exemplary embodiment, the PM machine 101 is a three phase machine having an inner rotor construction with energizable phase windings 106A, 106B, 106C wound about the stator 102, which are energized through the application of electric power to the motor terminals.

A drive 108 is coupled to the terminals of the machine for providing electric power. The drive 108 receives control inputs from a controller 110 that receives energization feedback 112 from the machine (such as the currents and/or voltages at the motor terminals), or that assumes the actual voltage supplied to the motor is that which was demanded by the controller 110 (e.g., in the form of PWM duty cycle), from which the electrical angle and electrical speed can be determined (i.e., estimated sensorlessly). From these estimates, rotor speed can be inferred, as can rotor angle (to the extent the estimates are based upon electrical angle). The controller 110 of FIG. 1 is shown as receiving an input demand 114 that may be, for example, a torque demand or a speed demand.

While the drive 108 of FIG. 1 is illustrated in exemplary form as energizing three power terminals of a three phase machine 101, it should be understood that more or fewer power terminals may be provided to accommodate machines with greater or less than three phases, or if various types of inverters (e.g., with neutral connections) are used. The drive may be of conventional design and configured to provide, for example, sine wave excitation to the motor terminals or square wave excitation using conventional pulse width modulation (PWM) excitation.

Figure 2:
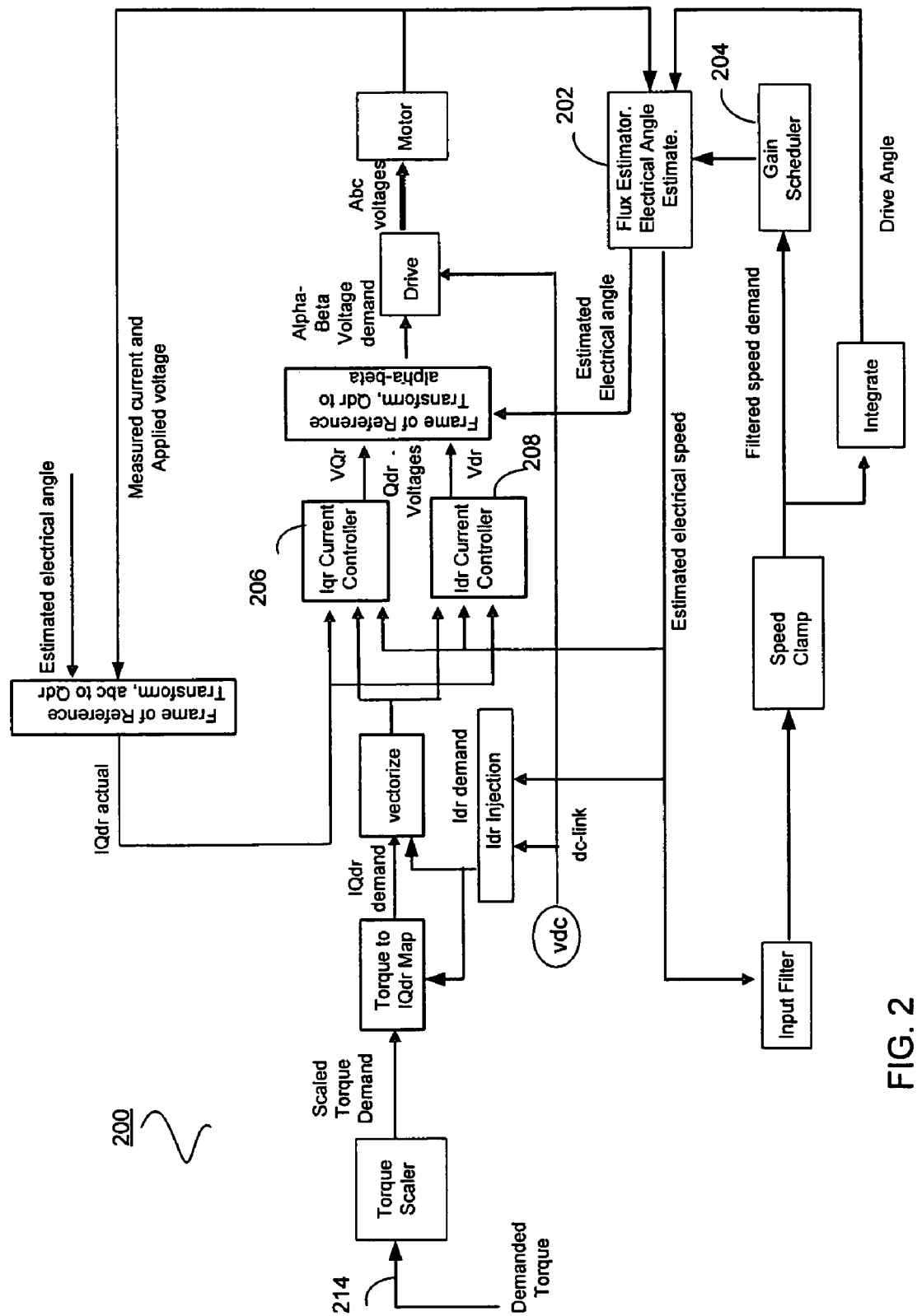
FIG. 2 is a block diagram of a PM machine system configured to operate primarily in a torque control mode according to another exemplary embodiment of this disclosure.

FIG. 2 illustrates additional details of the system of FIG. 1 as configured to operate primarily in a torque control mode. For this reason, a torque demand input 214 is shown in FIG. 2. The torque demand input may be received directly by the system 200 as an external command or alternatively, may be derived from an external command. For example, the torque demand input may be derived from a speed demand input or from an air flow demand input (e.g., where the system of FIG. 2 is embodied in an air handler/blower for a climate control system). Additional details regarding the embodiment of FIG. 2 are provided in U.S. Application No. 11/293,743 filed on Dec. 2, 2005] titled Control Systems and Methods for Permanent Magnet Rotating Machines and filed [on even date herewith], the entire disclosure of which is incorporated herein by reference.

Figure 3:
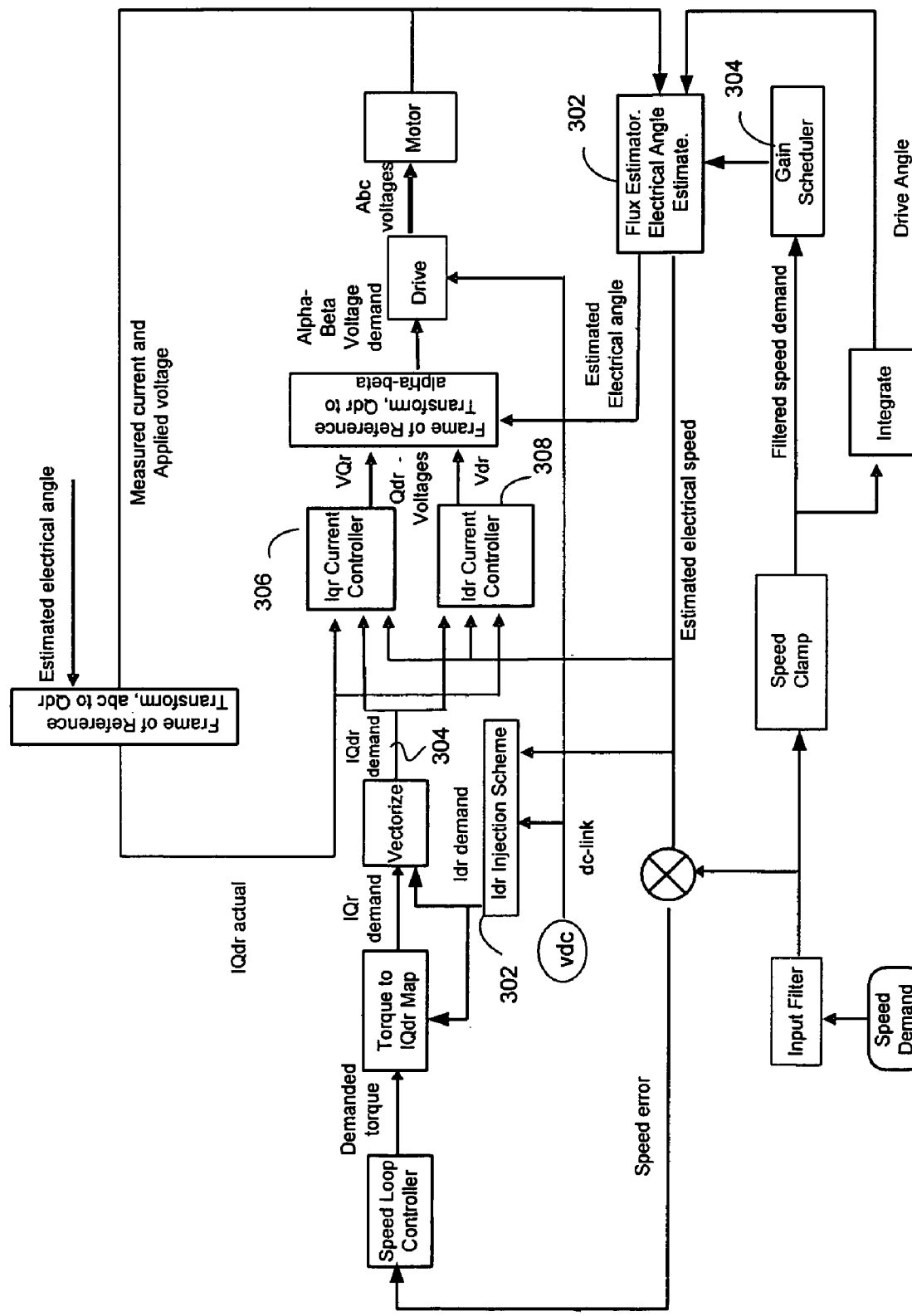
FIG. 3 is a block diagram of a PM machine system configured to operate primarily in a speed control mode according to another exemplary embodiment.

FIG. 3 illustrates additional details of the system of FIG. 1 as configured to operate primarily in a speed control mode. Further information regarding operating in speed control modes is set forth in U.S. Pat. No. 6,756,753.

Described below are several additional improvements in controlling a PM machine according to various aspects of the present disclosure. It should be understood that each improvement can be advantageously implemented by itself or in combination with one or more other improvements disclosed herein.

As shown in FIGS. 2 and 3, the controller of FIG. 1 can include an estimator 202, 302 for estimating the machine's electrical speed and angle. In some embodiments, the estimators 202, 302 employ a Luenberger Observer. However, other types of observers, including the Kalman Estimator, may be employed.

According to one aspect of the present disclosure, the gain of an estimator—such as the estimators 202, 302 shown in FIGS. 2 and 3—can be varied (e.g., using the gain schedulers 204, 304 shown in FIGS. 2 and 3) as a function of either a demanded rotor speed (including a filtered demanded speed) or an estimated rotor speed. In this manner, control system poles (i.e., poles of the observer) can be positioned at desired locations, including maintaining the poles at desired and not necessarily fixed locations to improve control system and machine stability.

In a torque control mode of operation, there is no demanded speed. Therefore, the estimator gains are preferably varied as a function of the estimated rotor speed so as to position the control system poles at desired locations. The estimated rotor speed used in the gain scheduling may be pre-processed in a suitable manner before being used in the gain scheduling scheme, typically being passed through a low pass filter.

In one embodiment of a speed control mode of operation, the pole locations of the estimators 202, 302 are increased as speed increases, with the slowest pole locations occurring as the system is switched from open loop operation to closed loop operation.

The gain values can be calculated for a range of speeds. This may be done on the fly by the gain scheduler 204, 304 of FIG. 2 or 3 using a closed form set of equations. Alternatively, the gain values may be retrieved by the gain scheduler from one or more look-up tables or from a fitted curves characterizing the gain-speed profile for a specific motor.

Figure 4:
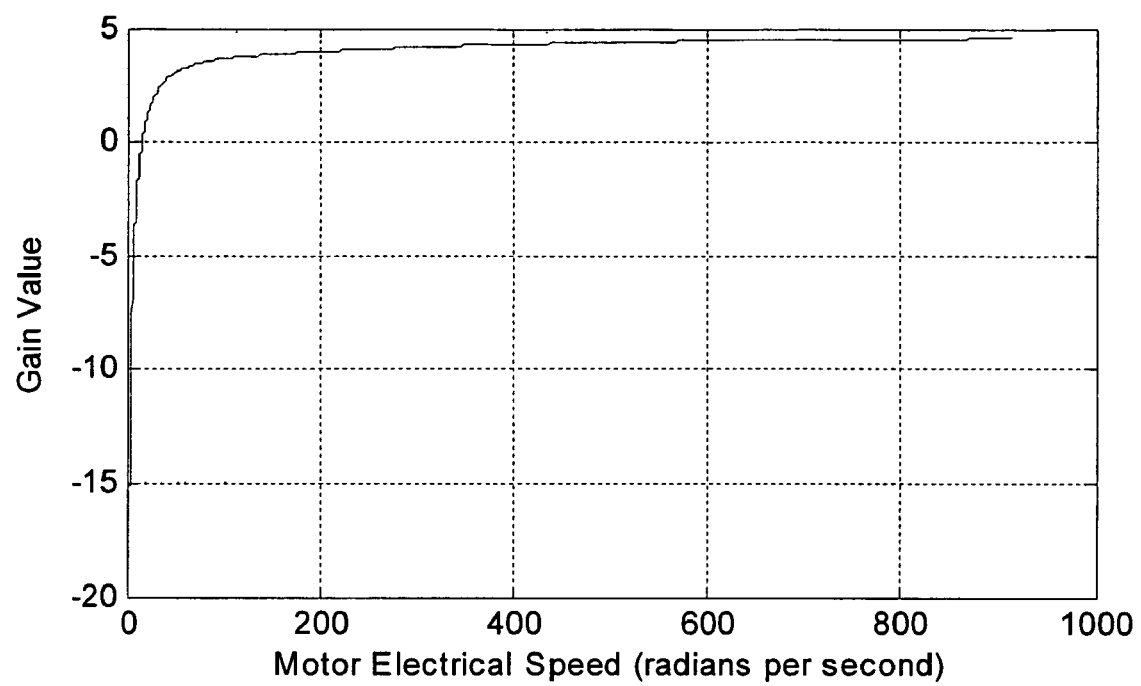
FIG. 4 is a graph illustrating how gain values can be varied with respect to rotor speed so as to maintain the poles of an observer employed by the estimators of FIGS. 2 and 3 in desired locations.

FIG. 4 illustrates how gain values are varied with respect to the electrical speed in one exemplary embodiment so as to maintain observer poles at desired locations.

Figure 5A:
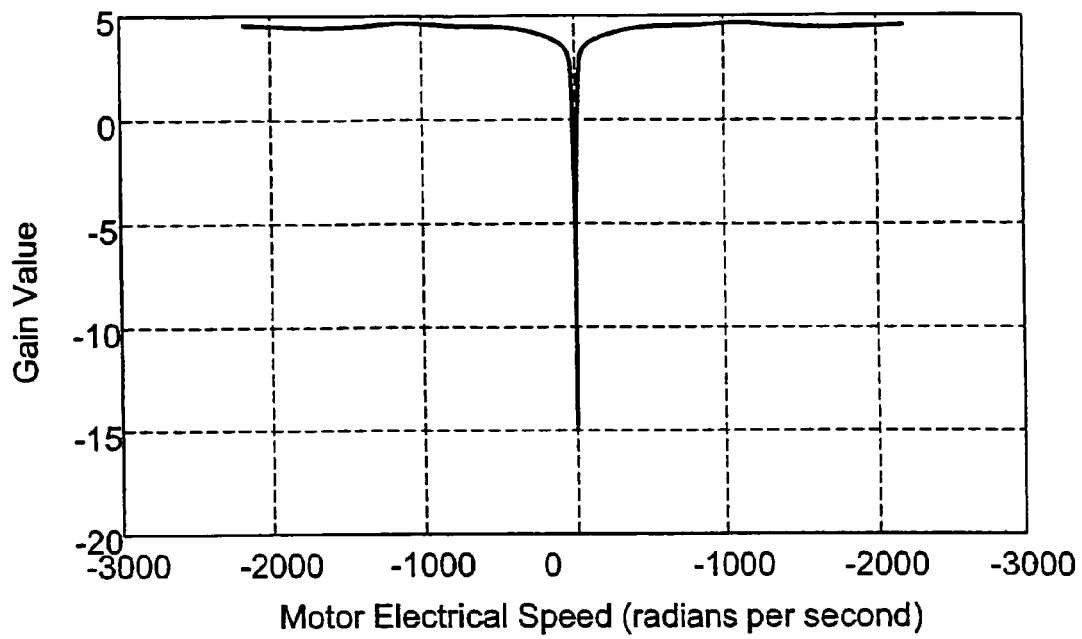
FIGS. 5a and 5b illustrate how estimator gain values approach excessive values as the rotor speed approaches zero.
Figure 5B:
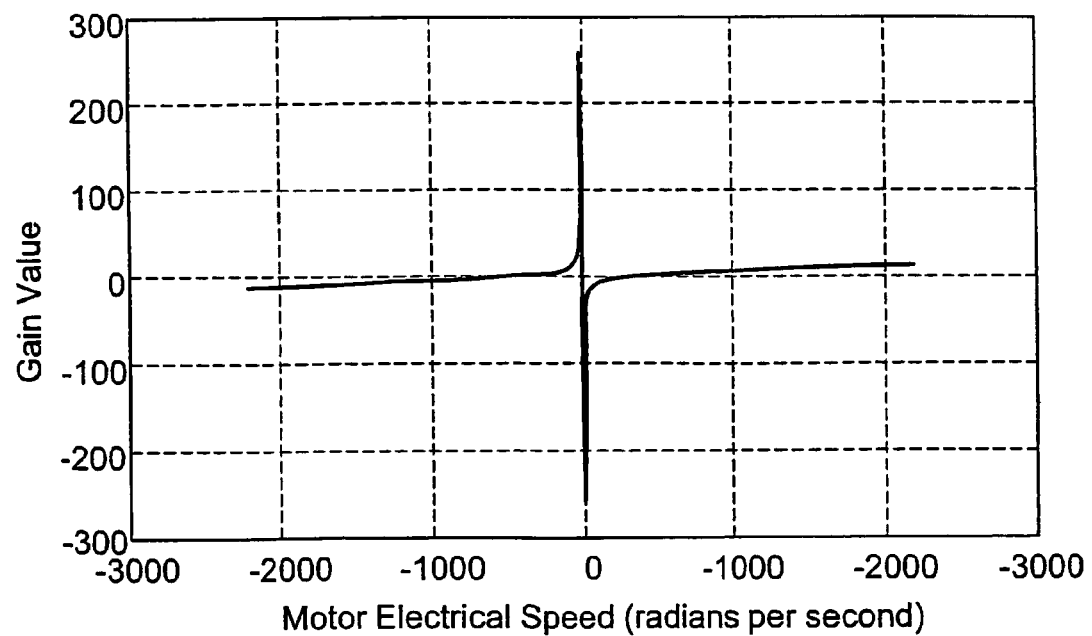

FIGS. 5a and 5b illustrate how gain values approach excessive values as the electrical speed approaches zero. For this reason, gain values are preferably not calculated as described within a range of values around zero electrical speed. At low or zero speeds, predetermined gain values which are sufficiently high, but not excessive, are preferably used, thereby improving control system stability.

Figure 6:
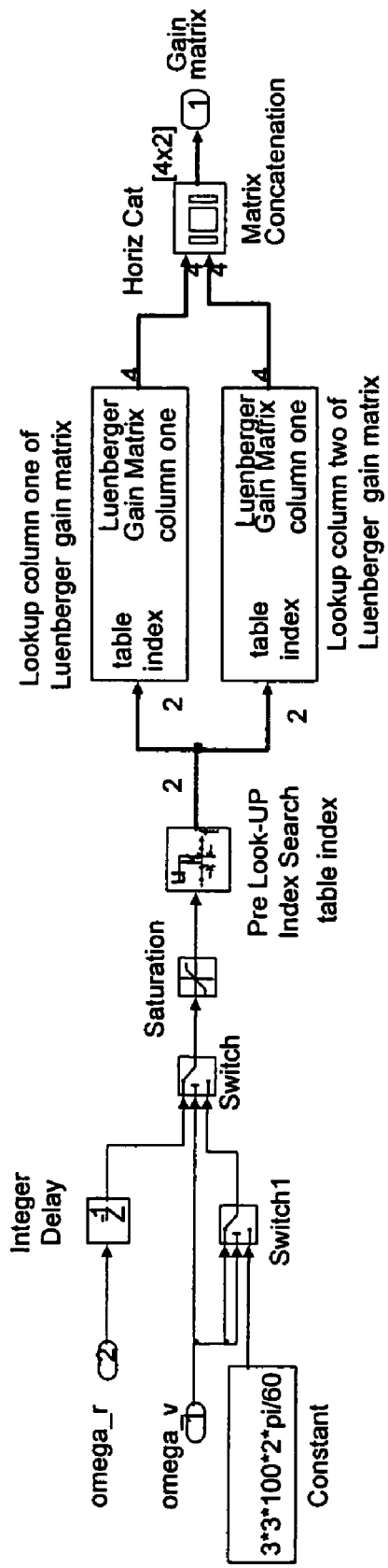
FIG. 6 is a block diagram illustrating how estimator gain values can be stored in and accessed from lookup tables.

FIG. 6 illustrates how gain values may be stored in and accessed from lookup tables. In the particular embodiment of FIG. 6, two columns of gain values are constructed through a multiplexer and then concatenated together to form a 4×2 gain matrix.

Figure 7:
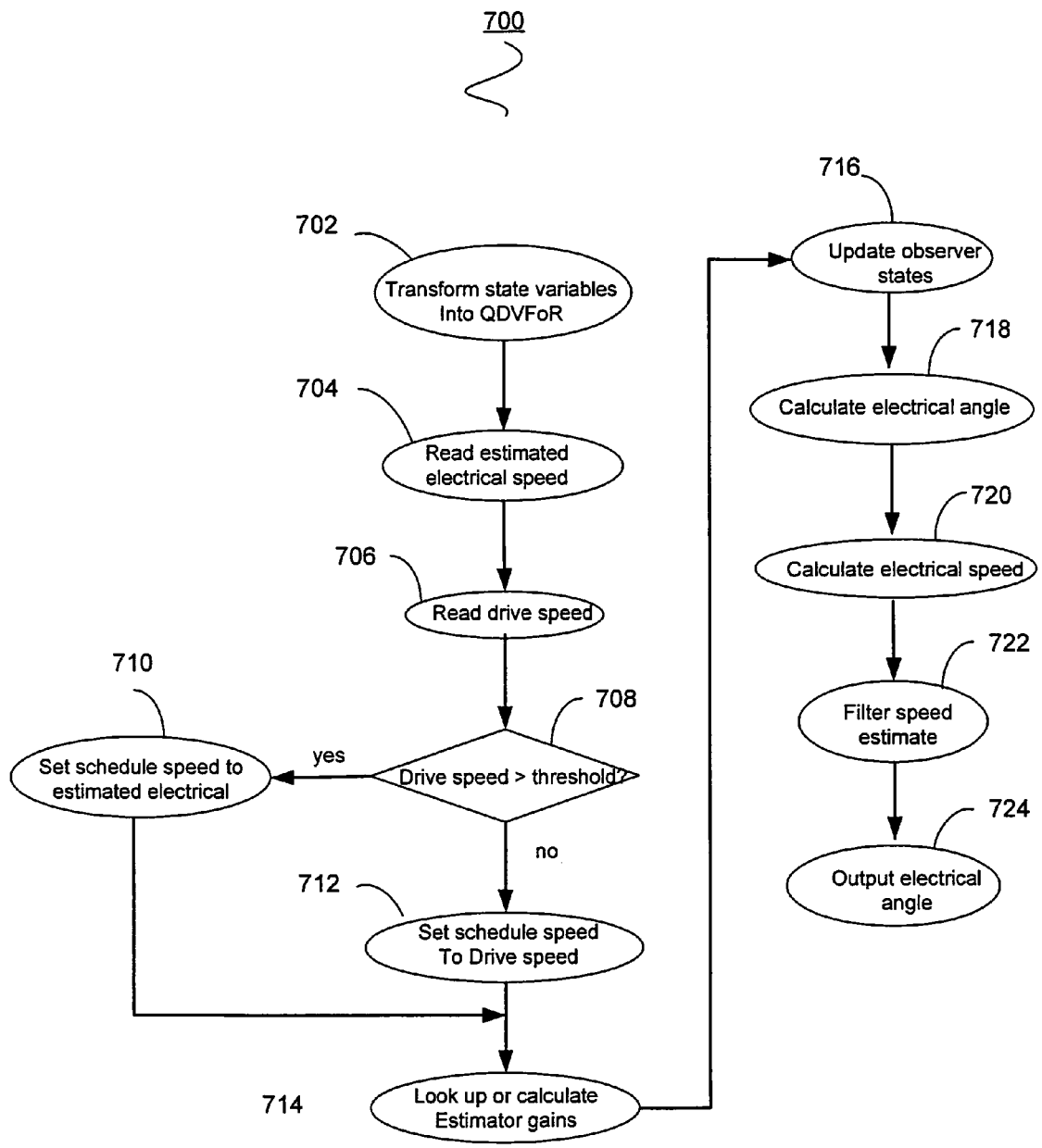
FIG. 7 is a flow diagram of a method implemented by the gain schedulers of FIGS. 2 and 3 according to another exemplary embodiment.

FIG. 7 is a flow diagram 700 illustrating one preferred implementation of the gain schedulers 204, 304 of FIGS. 2 and 3 in which the speed used by the gain scheduler, referred to as the scheduled speed, is set to the drive speed (i.e., a demanded rotor speed) at lower rotor speeds and to the estimated electrical speed at higher rotor speeds.

In step 702, the controller transforms state variables into a rotating frame of reference. In step 704, the controller reads the estimated electrical speed and then reads the drive speed (i.e., the demanded speed) in step 706. In step 708, the controller compares the drive speed to a predetermined threshold speed. The predetermined speed threshold parameter can be selected, as needed, for any given PM machine.

If the drive speed is greater than the predetermined threshold speed, the scheduled speed used by the gain schedulers 204, 304 (FIGS. 2 and 3) is set equal to the estimated electrical speed in step 710. If the drive speed is less than the predetermined threshold speed, the scheduled speed used by the gain schedulers 204, 304 is set equal to the drive speed in step 712. Subsequent to controller selection of the appropriate scheduled speed, the selected schedule speed is used by gain schedulers 204, 304 to look up or calculate the estimator gains in step 714 to maintain the system poles at desired positions. The estimator uses the scheduled gain factors and the updated observer states in step 716 to calculate an updated estimated electrical angle in step 718 and an updated estimated electrical speed in step 720. The updated electrical speed estimate is filtered in step 722 and the filtered speed estimate is integrated in step 724 to produce an updated electrical angle demand.

According to another aspect of the present disclosure, a Qr-axis current can be selected that, in conjunction with a given value of dr-axis current, will produce a desired rotor torque. This aspect is particularly well suited to hybrid PM/SR motors, where the dr-axis current component contributes to the amount of torque produced, and especially hybrid PM/SR motors employing a dr-axis injection current.

Figure 8:
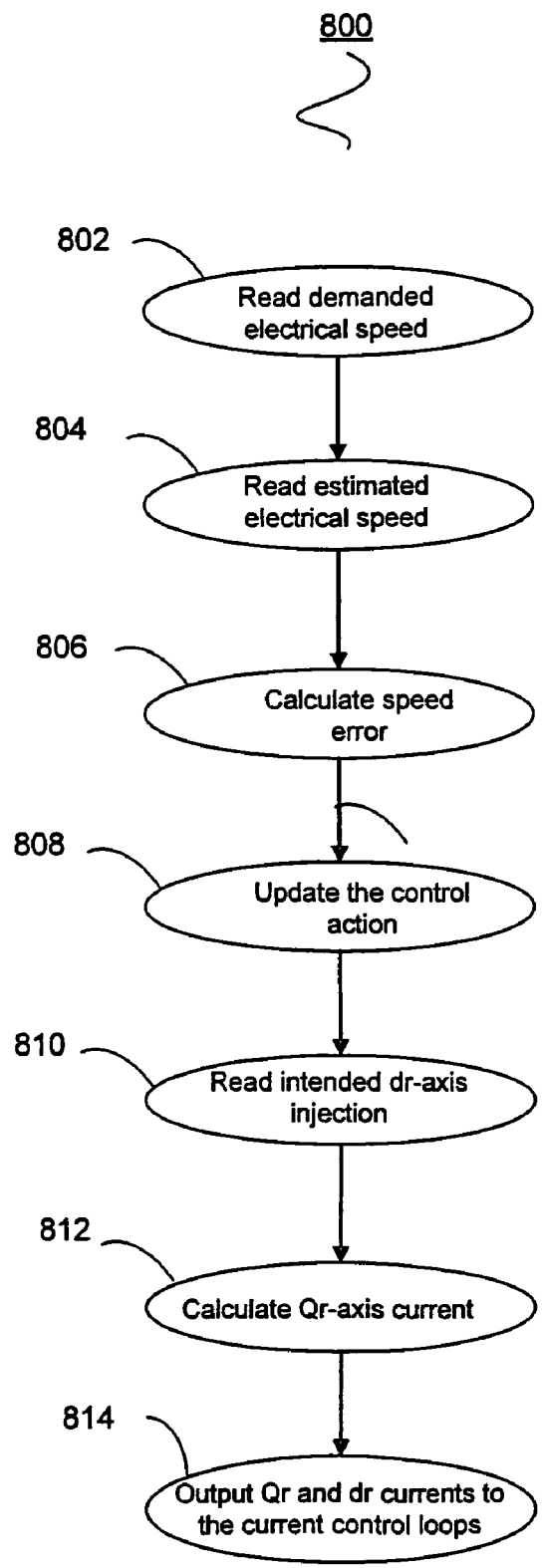
FIG. 8 is a flow diagram of a method of calculating a Qr-axis current based on a given dr-axis current injection to produce a desired rotor torque according to another exemplary embodiment.

FIG. 8 is a flow diagram 800 illustrating a method of calculating a Qr-axis current based on a given dr-axis current injection to produce a desired rotor torque according to one exemplary embodiment. In this embodiment, the dr-axis current injection is calculated off-line in accordance with a dr-axis current injection method described in co-pending U.S. Application Ser. No. 11/293,743 noted above. These values are typically stored in a lookup table but may also be described as a mathematical function in alternative embodiments. The motor speed and the value of the dc-link are used to calculate the value of the dr-axis injection current to be applied at any given moment in time.

In step 802, the controller reads the demanded electrical speed 802 and then reads the estimated electrical speed in step 804. In step 806, the controller calculates a speed error. The controller uses the calculated speed error from step 806 to update the control action in step 808. After updating the control action, the controller reads the intended dr-axis injection current in step 810, calculates the Qr-axis current required to produce a demanded torque in step 812 and outputs the demanded Qr- and dr-axis currents in step 814 to a pair of current controllers, such as current controllers 206, 208 of FIG. 2 or current controllers 306, 308 of FIG. 3.

Figure 9:
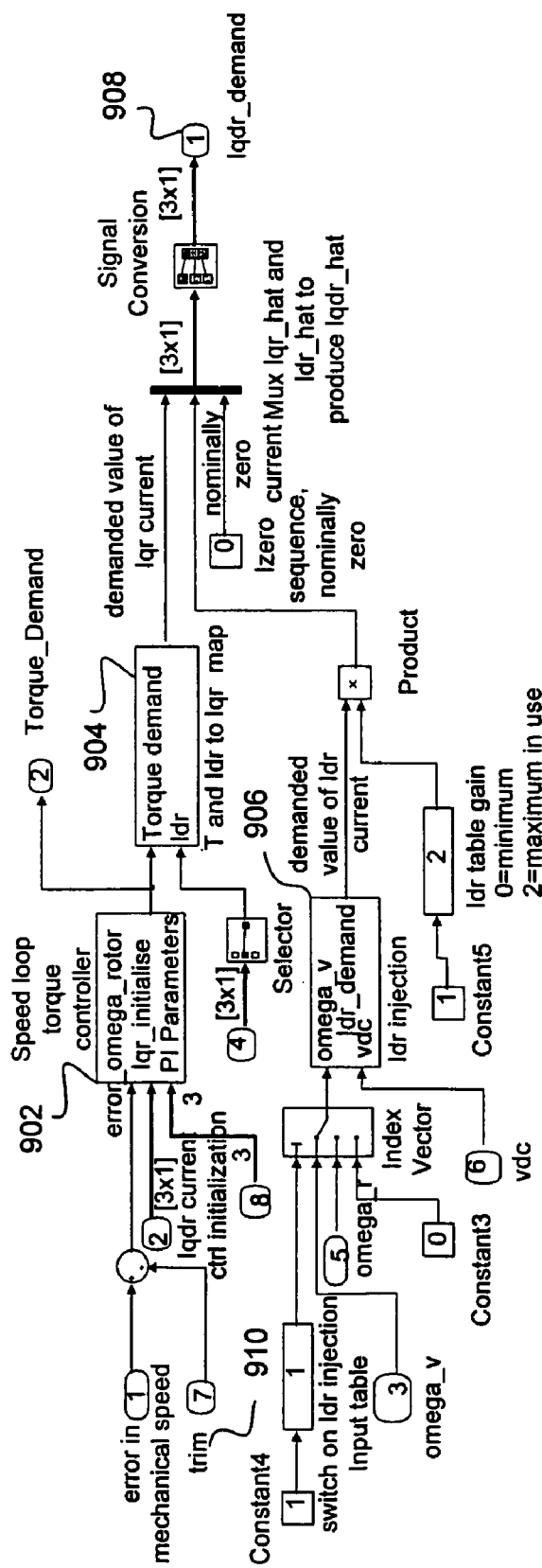
FIG. 9 is a block diagram of a speed loop controller, a torque to IQdr Map block, and a Idr injection block according to another exemplary embodiment.

FIG. 9 is a block diagram of a speed loop controller 902, a torque to IQdr Map block 904, and a Idr injection block 906 according to another exemplary embodiment. As shown in FIG. 9, the selected Qr-axis current and the dr-axis injection current are multiplexed and provided to a pair of current controllers, preferably as a multiplexed demand signal, IQdr demand 908. In this embodiment of the Idr injection block 906, the required Idr current is calculated from the speed error, assuming that Idr is for the moment nominally zero.

Figure 10:
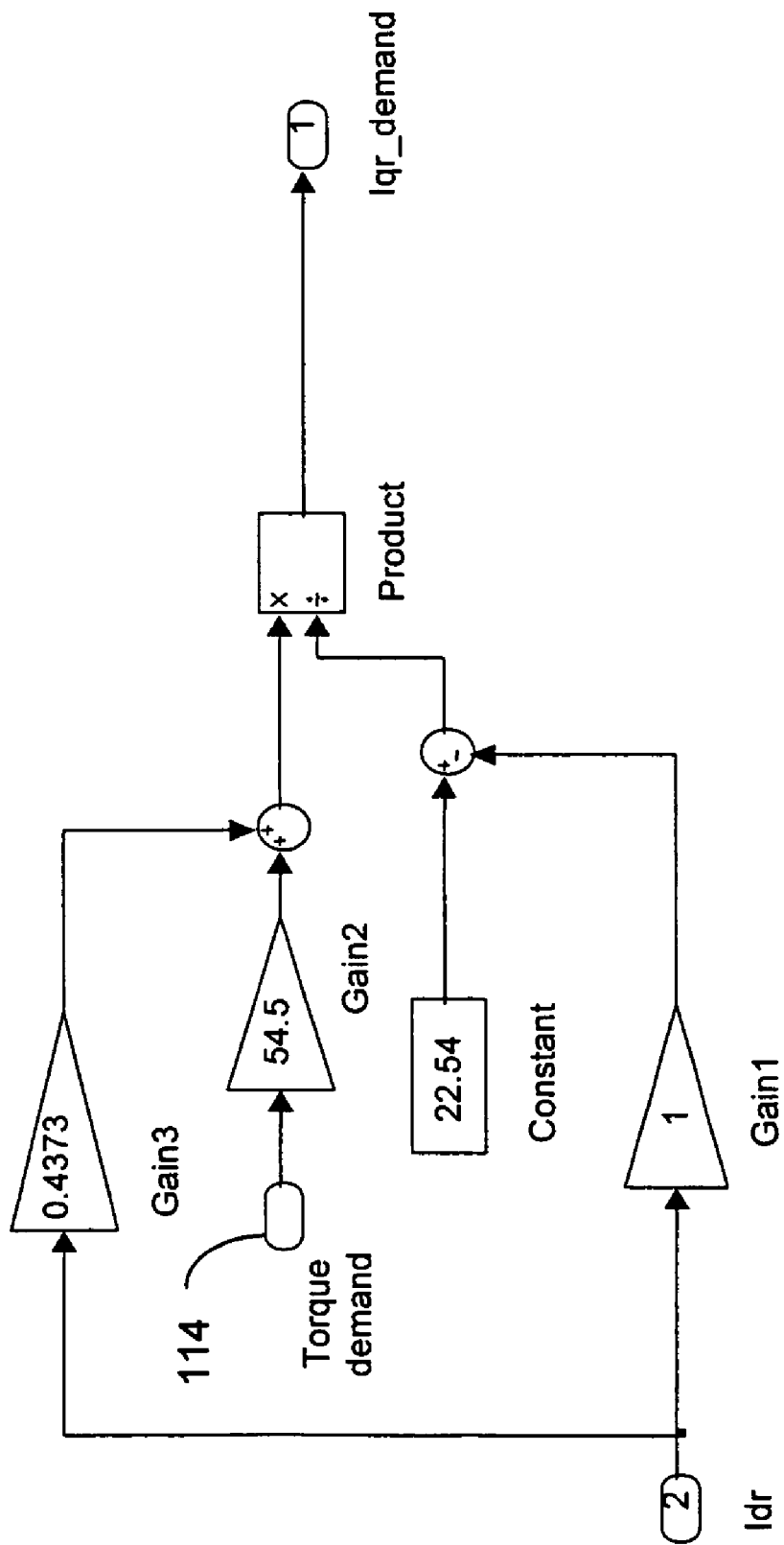
FIG. 10 is a block diagram of the torque and Idr to IQr map block of FIG. 9 according to another exemplary embodiment.

FIG. 10 is a block diagram of the Torque and Idr to IQr map block of FIG. 9 according to another exemplary embodiment of this disclosure. In this embodiment, using the motor-specific constants noted, the Iqr_demand is calculated as:

$$Iqr\_demand = (54.5*Torque\ demand + 0.4373*Idr)/(22.54-Idr)$$

The decoupling of IQdr components in the production of torque can be applied within either a sensorless control system or a sensor-controlled system. If a given motor does not show any discernible hybrid behavior, the control technique can default to that classically used with a PM motor (i.e., Idr torque contribution is assumed to be zero) where the torque contribution comes from IQr.

According to another aspect of this disclosure, the flux estimate produced by a flux estimator 202, 302, such as the estimators shown in FIGS. 2 and 3, can be compensated for saturation effects when the motor operates in the nonlinear saturation regions of stator magnetic flux. In this manner, errors in the flux estimate can be reduced, thus reducing errors in rotor position and/or rotor speed estimates produced from the flux estimate. As a result, the stability of the control system is improved under stator saturation operating conditions. This improvement is particularly important when the structure of the drive control is based upon manipulating variables generated using transformations having values dependent on the machine electrical angle. This aspect of the disclosure is particular well suited for hybrid PM machines, PM machines having embedded rotor magnets, and PM machines employing highly magnetized material.

The compensated flux estimate can be produced using nonlinear correction terms including, for example, dominant angle invariant terms associated with saturation, including cubic terms. Dominant angle-varying terms may also be used to produce the compensated flux estimate. Terms may also be present that include quadratic current expressions when they have a dominant effect on the flux estimate. In one embodiment of this disclosure directed to an air handler for a climate control system, the dominant terms are cubic.

Figure 11:
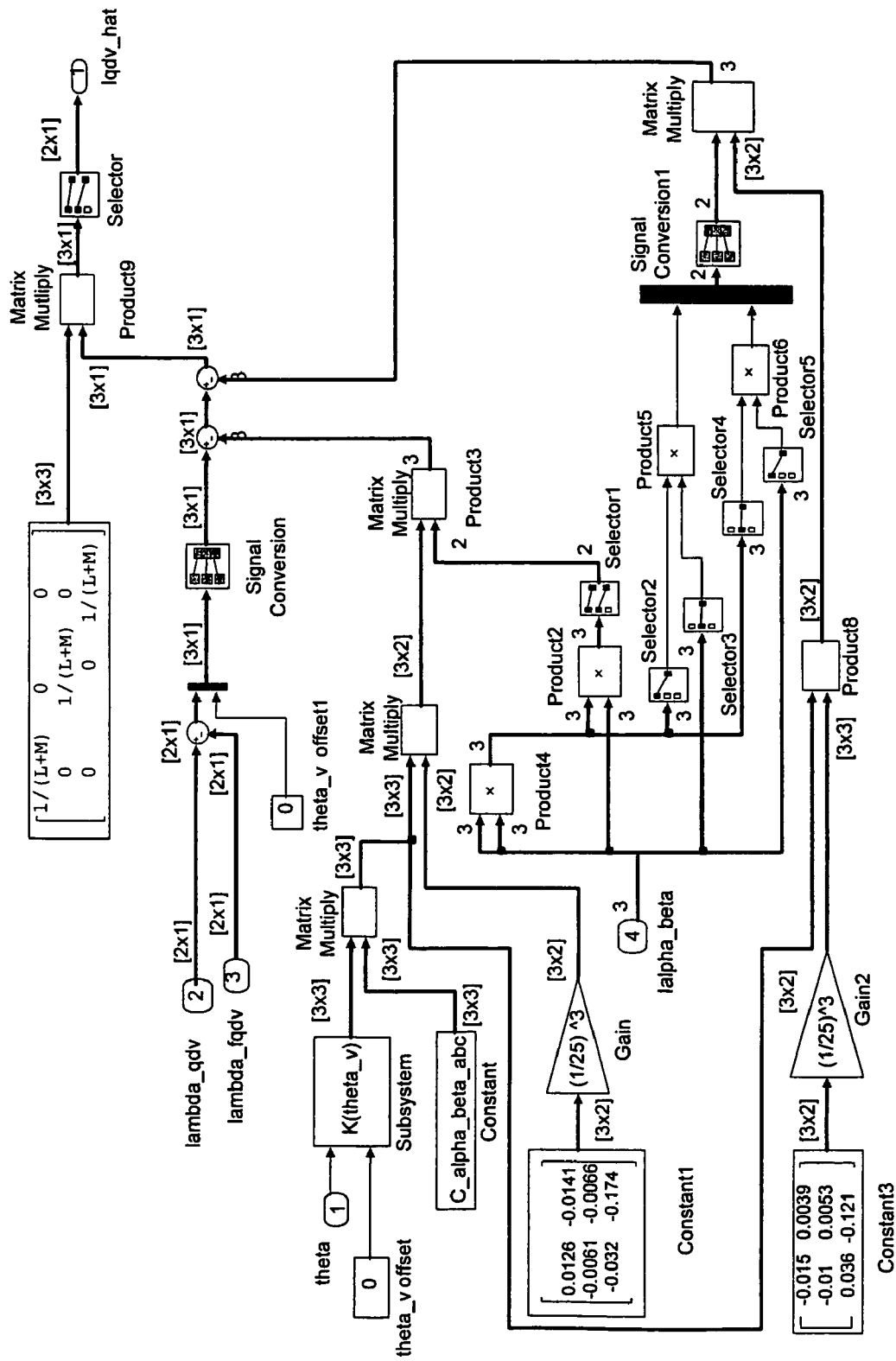
FIG. 11 is a block diagram illustrating how saturation effects can be compensated for in the measurement path of an observer according to another exemplary embodiment.

In one exemplary embodiment, a flux estimate is first produced using energization feedback 112 from the machine. This flux estimate is then compensated for saturation effects, with the flux estimate becoming significant as the saturation effects themselves become significant FIG. 11 is a block diagram illustrating how saturation effects are compensated for in the measurement path of an Observer (e.g., embodied in a flux estimator) according to one exemplary embodiment of this disclosure. When the controller detects saturation operation of the stator, the compensated flux estimate is used by the estimator to estimate rotor speed and rotor position.

According to another aspect of the present disclosure, a rotor position (i.e., angle) estimator—such as the estimators 202, 302 shown in FIGS. 2 and 3—can average samples of the energization feedback 112 from the machine and estimate the rotor position using the average sample values. In this manner, the magnitude of the potential error within each sampling interval is reduced in half, resulting in more accurate control of the machine when control of the machine is dependent on accurately estimating the rotor position. Although the magnitude of the potential error within each sampling interval increases as the sampling rate decreases, it should be understood that this aspect of the present disclosure can be advantageously used with any sampling rate to improve the accuracy of the estimated rotor position. The estimate calculation effectively compensates for time delays resulting from use of the angle estimate in the drive.

Preferably, each successive pair of samples (including the second sample from the immediately preceding successive sample pair) is averaged to produce a series of average sample values which are used to estimate the rotor position.

Figure 12A:
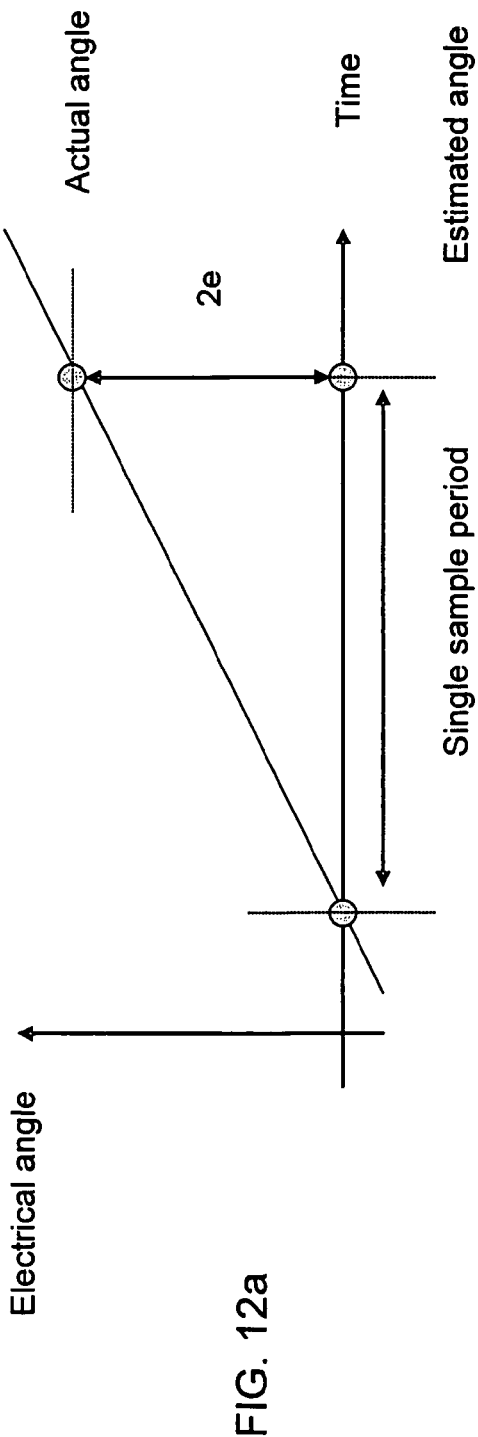
FIG. 12(a) is graph illustrating how two energization feedback samples are collected at the beginning and end of an exemplary sampling interval according to the prior art.
Figure 12B:
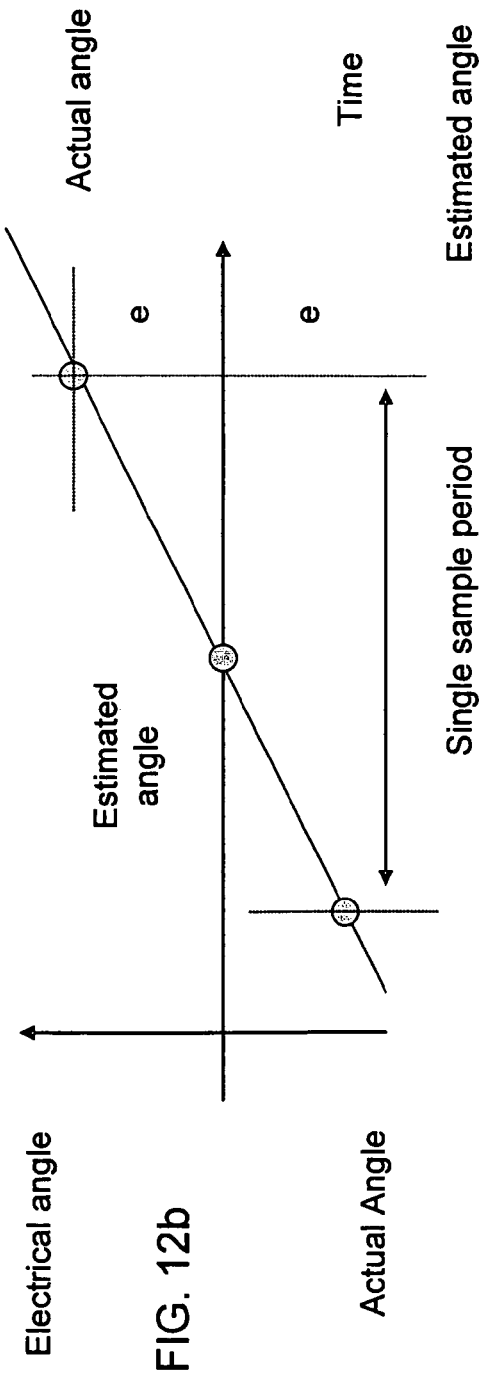
FIG. 12(b) is a graph illustrating how two energization feedback samples can be collected and averaged to produce an estimated rotor position/angle according to another embodiment of this disclosure.

FIG. 12(a) illustrates how two samples are collected at the beginning and end of an exemplary sampling interval according to the prior art, where each sample is treated as representing the actual rotor position/angle at the time such sample was obtained. FIG. 12(b) illustrates how two samples are collected and averaged to produce an estimated rotor position/angle. Collectively, FIGS. 12(a) and 12(b) illustrate that while the range of error (2e) remains the same, the absolute value of the potential error about the average angle estimate in FIG. 12(b) is reduced in half (+/−e) as compared to FIG. 12(a), where the angle error estimate could be as large as 2e.

According to another aspect of the present disclosure, a trim-adjusted speed error can be calculated and provided, e.g., to a speed controller—such as the speed controller shown in FIG. 3. An exemplary method includes producing a first rotor speed estimate, producing a second rotor speed estimate, and calculating a trim-adjusted speed error using the first rotor speed estimate and the second rotor speed estimate. Preferably, a trim value is produced by calculating a difference between the first rotor speed estimate and the second rotor speed estimate. Additionally, a raw speed error is preferably produced by calculating a difference between a demanded rotor speed and an estimated rotor speed (which may be the first rotor speed estimate or the second rotor speed estimate, and preferably the more reliable one of such estimates, which may depend, e.g., on the PWM rate of the motor drive). The trim-adjusted speed error is preferably calculated by adding the trim value to the raw speed error.

The first rotor speed estimate can be produced using modeled motor parameters, and the second rotor speed estimate can be produced using zero crossings detected from energization feedback from the machine. In this manner, the trim value and thus the trim-adjusted speed error can account for potential variations between modeled motor parameters and actual parameters of a production motor.

Figure 13:
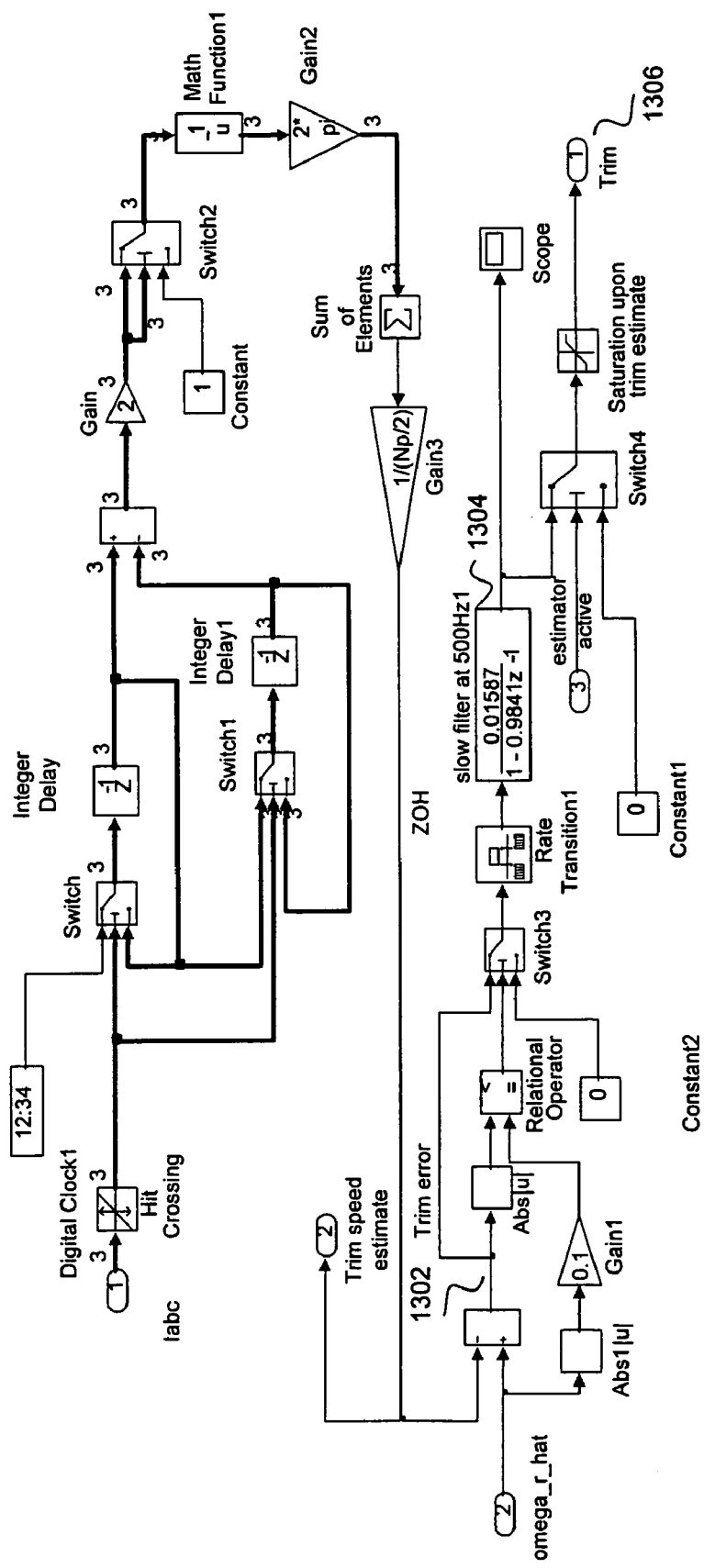
FIG. 13 is a block diagram of an exemplary speed trim mechanism for producing a speed trim value that can be provided to the estimator of FIG. 3 according to another exemplary embodiment of this disclosure.

FIG. 13 is a block diagram of an exemplary trim mechanism for producing a trim value that can be provided, e.g., to an estimator such as the estimator shown in FIG. 3. In this embodiment, the trim error 1302 is filtered using a first order low pass filter 1304. The filtered trim error signal 1306 is then added directly to the error signal driving the speed loop controller. FIG. 9, discussed above, illustrates an exemplary speed controller that includes an input 910 for such a trim value. The trim mechanism can be used to improve the performance of an estimator-based sensorless control system.

What is claimed:

1. A method of estimating rotor position in a sensorless control system for a permanent magnet rotating machine, the machine including a stator and a rotor situated to rotate relative to the stator, the stator having a plurality of energizable phase windings situated therein, the method comprising:
sampling energization feedback from the machine to obtain a plurality of samples;
averaging a pair of the plurality of samples to produce an average sample value;
estimating the rotor position using the average sample value; and
utilizing the estimated rotor position to control energizing of the phase windings to operate the permanent magnet rotating machine.

2. The method of claim 1 wherein averaging includes averaging a successive pair of the plurality of samples.

3. The method of claim 1 wherein averaging includes averaging each successive pair of the plurality of samples to produce a plurality of average sample values, and estimating includes estimating the rotor position using the plurality of average sample values.

4. A permanent magnet rotating machine and controller assembly configured to perform the method of claim 1.

5. A climate control system comprising the assembly of claim 4.

6. The climate control system of claim 5 wherein the system includes an air handler and wherein the air handler includes said assembly.

7. A method of controlling a permanent magnet rotating machine, the machine including a stator and a rotor situated to rotate relative to the stator, the stator having a plurality of energizable phase windings situated therein, the method comprising:
producing a first rotor speed estimate;
producing a second rotor speed estimate;
calculating a trim-adjusted speed error using the first rotor speed estimate and the second rotor speed estimate; and
utilizing the trim-adjusted speed error to control energizing of the phase windings to operate the permanent magnet rotating machine.

8. The method of claim 7 wherein calculating includes producing a trim value by calculating a difference between the first rotor speed estimate and the second rotor speed estimate.

9. The method of claim 8 wherein calculating further includes producing a raw speed error by calculating a difference between a demanded rotor speed and an estimated rotor speed.

10. The method of claim 9 wherein calculating further includes adding the trim value or a filtered trim value to the raw speed error.

11. The method of claim 7 wherein the first rotor speed estimate is produced using modeled motor parameters.

12. The method of claim 11 wherein the second rotor speed estimate is produced using zero crossings detected from energization feedback from the machine.

* * * * *